Feb. 12, 1929.
C. P. HARRISON
1,701,846
DIE HEAD
Filed May 19, 1927   2 Sheets-Sheet 1
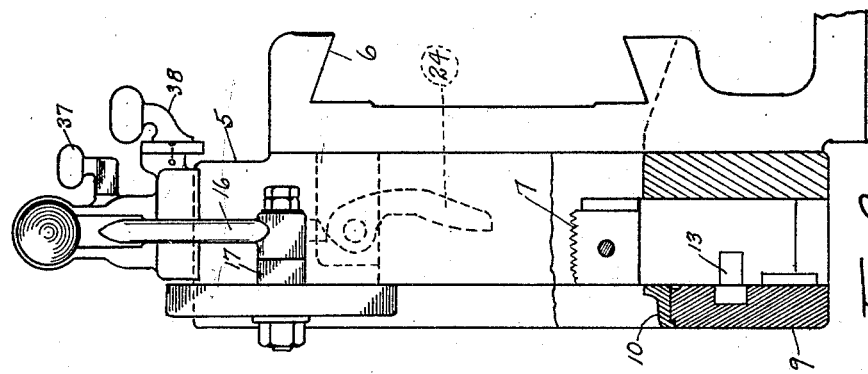
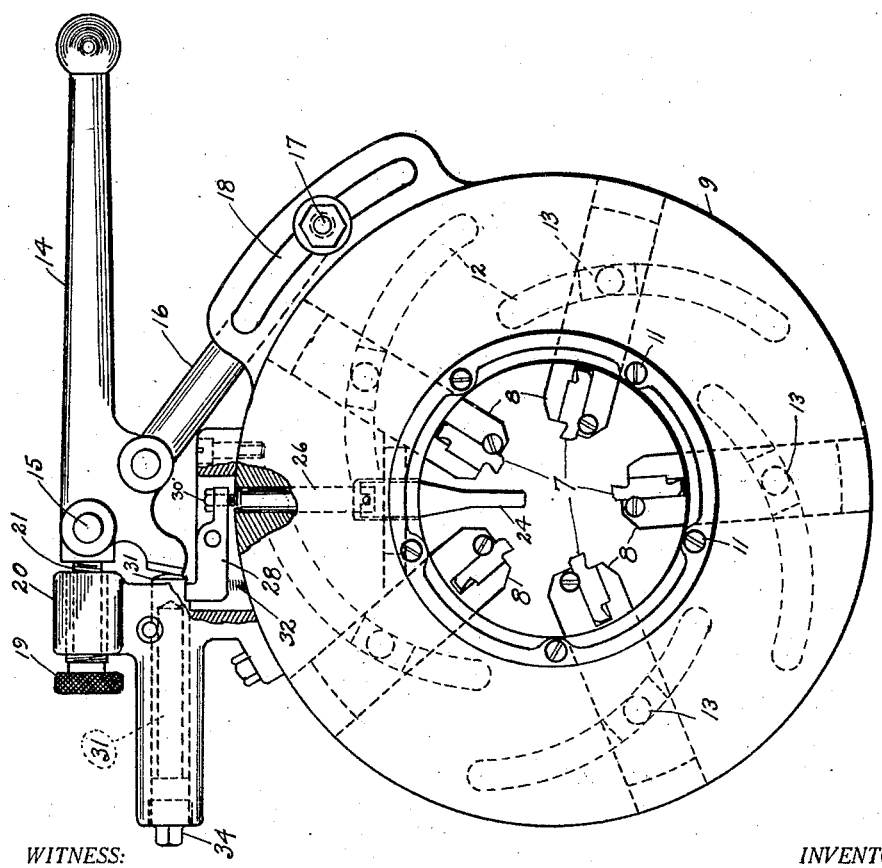

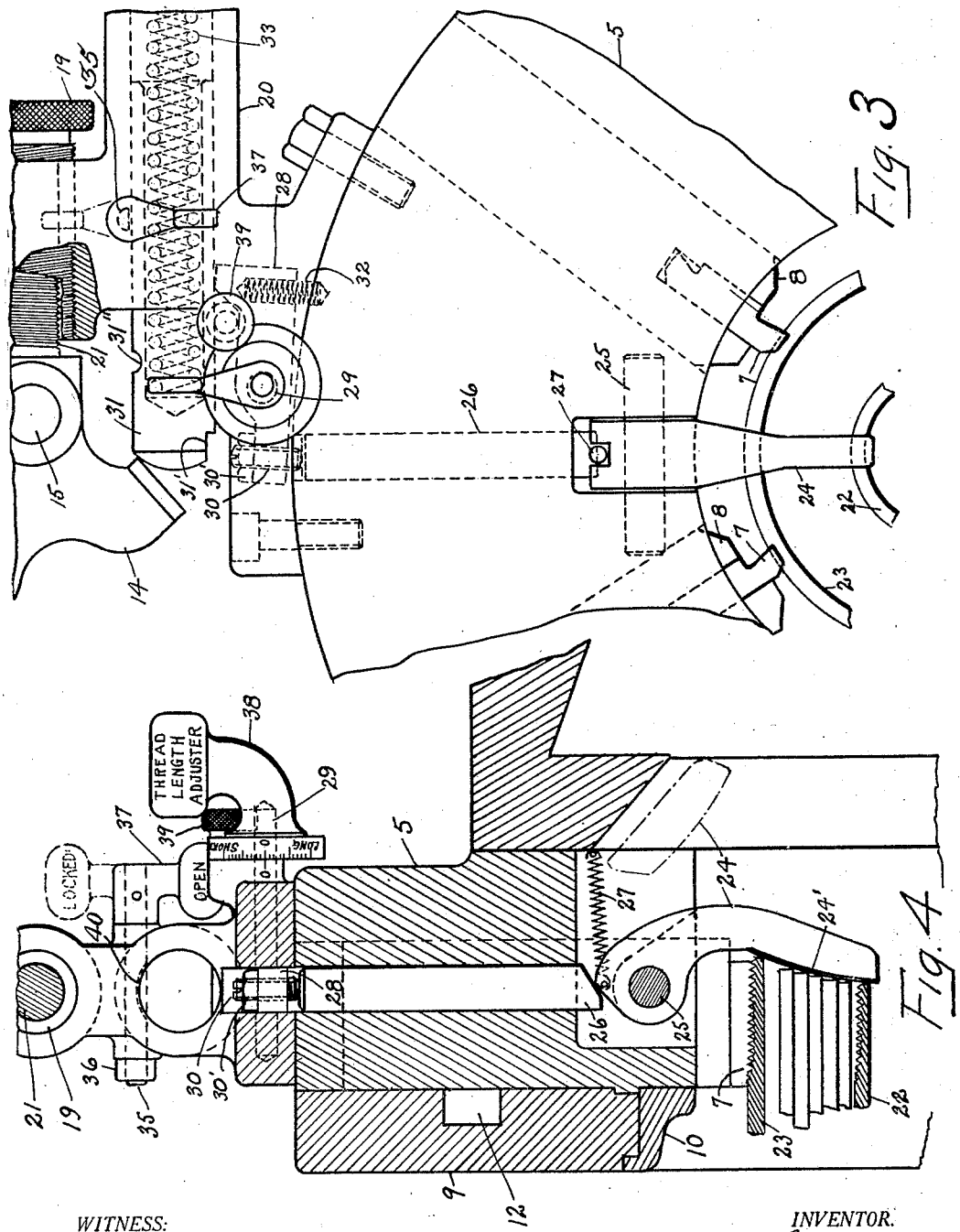

Patented Feb. 12, 1929.

1,701,846

UNITED STATES PATENT OFFICE.

CHARLES P. HARRISON, OF WESLEYVILLE, PENNSYLVANIA.

DIE HEAD.

Application filed May 19, 1927. Serial No. 192,669.

My said invention relates to a die head for threading pipe upon the type of machine in which several sizes of pipe are threaded in the same die head without changing chasers for the different sizes of pipe. It is an object of the invention to provide means whereby the die head will open automatically by power when the pipe has been threaded to the desired length in connection with means whereby the head can be manually operated independently of the power operating means.

Another object of the invention is to provide means whereby a tripping or opening device can be made to operate at the correct thread length of all standard sizes of pipe within the capacity of the machine, which device is arranged to recede and allow the pipe to pass through the head for cutting off, reaming or other operations and also return to operating position as soon as the pipe is removed, and which device is automatically reset by the closing of the die.

Another object of the invention is to provide means whereby the thread length can be set at a standard length which applies to all sizes of pipe, or at a longer or shorter length which also applies to all sizes of pipe, said adjustment being clear and visible to the operator.

Another object of the invention is to provide a locking device for the power opening means whereby the position of the operating lever reveals to the operator a legend informing him of the condition of said device.

Referring to the drawings which are hereby made a part hereof, and on which similar reference characters indicate similar parts;

Fig. 1, is a front elevation of the die head and operating device.

Fig. 2, a side elevation of said head partly in section, viewed from the right.

Fig. 3, an enlarged portion of a rear elevation of the die head showing the opening device in detail, and Fig. 4, an enlarged section of the die head showing the action of the pipe, the tripping device and an adjustment for the same.

In the drawings, reference character 5 indicates a die head mounted on a bracket 6 which is a part of the reciprocatory carriage of a pipe threading machine having a set of threading chasers 7 carried by chaser holders 8 slidably supported in radial slots. The chaser holders are operated by a cam plate 9 mounted on the front of the die head for oscillation about the axis of the same on a ring 10 secured to the die head by screws 11. The cam plate has cam slots 12 acting on blocks 13 secured to the chaser cases 8 whereby the chasers are moved in or out as the plate is rotated relatively to the remainder of the die head.

A toggle lever 14 is pivoted at 15 on a stem 21 having threads engaging internal threads in a screw 19 threaded in a bracket 20 on the die head, the screw having a knurled head for convenient adjustment. The lever is connected by a link 16 to a stud 17 adapted to be clamped in suitable position in a slot 18 in a fin projecting from plate 9, change of position of the stud affording a rough adjustment of the chaser holders, and therefore of the chasers, for acting on pipes of different sizes. Fig. 4 shows in sections standard pipes of various sizes, the smallest size 22 and the largest size 23 being in section, while the intermediate sizes are indicated diagrammatically by full lines, it being understood that there is no intention of limiting by this disclosure either the sizes or the number of sizes of pipe to which the die head is applicable, which is merely intended to provide a graphic illustration of the positions of the ends of pipes of different sizes just as the chasers 7 have finished their operation.

The adjustment above referred to is an approximate one and a final adjustment is made after clamping the stud 17 in place, by turning the knurled head of screw 19, which has a right-hand thread while the stem 21 has a left-hand thread. This gives a quick adjunstment and eliminates the need of lock nuts, as the adustment is self-locking.

For opening the head by turning the plate 9 I provide means including a trigger 24 with a face 24′ formed to engage the end of a pipe of any size within the capacity of the head and trip the head just as the standard length of thread is completed (Fig. 4) by operating a plunger 26. The trigger is fulcrumed at 25 and a spring 27 tends to swing it forward beyond the position in Fig. 4 when not restricted by the presence of work. The trigger can also swing back into the dot and dash line position in said figure to clear the work as it is passed through the head for cutting off, reaming or other operations, the spring serving to return the trigger as soon as the work is withdrawn.

A latch 28 (Figs. 1, 3 and 4) is pivoted on an eccentric portion of a shaft 29 pivoted in the bracket 20, said latch having an adjustable screw 30 at its forward end engaging the plunger 26, and being locked in adjusted position by a locknut 30'. At its rear end the latch is formed to engage a shoulder at 31' on a plunger 31 moved by a spring 33 in a direction to open the head by pressing against a depending arm of lever 14. The pressure of spring 33 is adjustable by a screw-plug 34. It will be evident that the plunger is forced back against the action of spring 33 when the closing lever 14 is pulled down to move the chasers to working position, so that a spring 32 can raise the rear end of the latch 28 and so cause the latch to hold the head closed.

A locking device for plunger 31 is journalled in bracket 20, said device comprising a shaft 35 having an arcuate notch as indicated in dotted lines at 40 in Fig. 4 conforming to the radius of plunger 31 and the shaft being of suitable size to engage a notch 31'' in the plunger. In the position shown in Fig. 3 the plunger will be free, but if the shaft 35 is turned when the plunger has been forced back so as to bring notch 31'' into engaging position the shaft will engage the notch and prevent further operation of the plunger until released. A rock arm on the shaft carries at opposite sides of its flattened end the legends "Open" and "Locked", the condition of the head in this respect being thus indicated by means appearing on the side nearest the operator and clearly visible to him. A collar 36 on the shaft prevents endwise movement.

The eccentric shaft 29 has an arm 38 secured thereto with a visible legend describing its use. The hub of the arm is provided peripherally with graduations arranged in opposite directions from a zero point, said zero being the setting for a standard length of thread on each size of pipe. For greater lengths the arm is moved back and for shorter lengths it is moved forward, the marks being all so located as to face the operator and to be readily visible to him. A thumb screw 39 with a knurled head serves to lock the arm in adjusted position. Adjustment of the arm and thereby of the eccentric shaft serves to raise or lower the middle part of the latch 28 so as to cause unlatching of the plunger 31 at earlier or later times in the movement of trigger 24 and so adjust the length of thread formed by the chasers.

In the operation of my device a length of pipe as 23 is placed in operating position and the die head is closed by pulling down lever 14 until plunger 31 is forced back far enough to permit latch 28 to engage shoulder 31', the chasers having previously been set by means of stud 17 and screw 19, and the thread adjuster 38 having been set for the length of thread desired. The machine is then started and the pipe revolves, the die head advancing according to the lead of the thread until the pipe engages trigger 24 and then gradually pushing it back to the tripping position of Fig. 4, whereupon plunger 26 pushing against latch 28 releases plunger 31 which then swings lever 14 as indicated in Fig. 3 and through link 16 moves plate 9 counter-clockwise to carry the chasers away from the work, i. e., to open the head.

The die head can then be further advanced passing the pipe through for other operations and the trigger 24 continues to swing back allowing the pipe to pass through unobstructed. As soon as the pipe is withdrawn the spring 27 returns the trigger to operating position without any attention from the operator. It is obvious that the die head can be manually opened by the lever 14 with the locking device either open or locked, and also that with the locking device locked a long thread may be cut and the die opened manually when the desired length of thread is obtained.

It will be obvious to those skilled in the art that many changes may be made in my device and in its use, all without departing from the spirit of the invention, therefore I do not limit myself to the specific embodiment shown in the drawings and described in the specification, but only as indicated in the appended claims.

Having thus fully described my said invention what I claim as new and desire to secure by Letters Patent is:

1. A die head comprising a body, chasers thereon, means for moving them into and out of operative position, means directly carried by the head for actuating said moving means, a latch directly on the head for said means, a pivoted trigger in the head in the path of the work, and connections from said trigger to said latch.

2. A die head comprising a body, chasers thereon, means for moving them into and out of operative position, automatic work-controlled actuating means for said means, and means whereby said automatic means may be locked out of action so as to be unaffected by the work, said locking means including a part having faces alternately visible to the operator with legends thereon indicating the condition of said automatic actuating means.

3. A die head comprising a body, chasers thereon, means for moving them into and out of operative position, said means including a spring-pressed plunger for automatically collapsing the die head, means whereby said plunger may be locked to render the opening of the die head non-automatic, and a lever manually operable to open and close the head irrespective of the condition of said locking means.

4. A die head comprising a body, chasers carried thereby, a cam plate rotatable about the axis of the body to move the chasers in or out, a plunger located in a radial bore of the body, a trip pivoted internally of the body said trip having a cam face acting on a face of the plunger to move it outward, a spring for moving said trip toward operative position, a lever movable in a plane transverse to the axis of the die head, a link connecting the lever to the came plate, a spring-pressed plunger acting on an arm of the lever to move the lever in a direction to move the chasers outward, and a pivoted latch for said spring-pressed plunger said latch being releasable by outward movement of said radially-movable plunger.

5. A die head comprising a body, chasers thereon, means for moving the chasers toward and away from the work including a lever, spring-pressed means for moving the lever in a direction to open the head, a latch controlling said means, an angularly adjustable shaft having an eccentric portion providing a fulcrum for the latch, and means whereby said shaft may be fixed in adjusted position.

6. A die head comprising a body, chasers thereon, means for moving the chasers away from the work including a cam-plate, a lever having two arms movable in a plane transverse to the axis of the die-head, a link pivoted to one arm of the lever and the cam-plate, the fulcrum of the lever and the pivots of the link being arranged to lock the head in closed position by a toggle action, resilient means acting upon the other arm of the lever to move it in a direction to move the chasers away from the work, and work-controlled means for preventing such movement, the weight of the lever being so disposed with reference to its fulcrum that it tends to keep the toggle locked.

In testimony whereof I affix my signature.

CHARLES P. HARRISON.